United States Patent [19]

Pitz

[11] Patent Number: 5,124,857
[45] Date of Patent: Jun. 23, 1992

[54] VEHICULAR LIGHT MONITORING APPARATUS

[76] Inventor: Francis G. Pitz, 411 S. Adams Apt. #3, Johnson City, Ill. 62951

[21] Appl. No.: 693,154

[22] Filed: Apr. 29, 1991

[51] Int. Cl.⁵ .......................... G02B 7/18; A47G 1/16; F21V 33/00
[52] U.S. Cl. .................... 359/872; 359/881; 248/170; 248/472; 248/474; 248/481; 362/138; 362/139; 362/140; 362/250
[58] Field of Search ......... 350/629, 632, 639; 248/469, 472, 473, 474, 481, 170; 362/83.1, 138, 139, 84, 140, 225, 249, 250; 359/868, 871, 872, 881

[56] References Cited

U.S. PATENT DOCUMENTS

| | | | |
|---|---|---|---|
| 328,739 | 10/1885 | Widerer | 248/474 |
| 404,110 | 5/1889 | Pincus | 248/474 |
| 898,263 | 9/1908 | Rice | 248/474 |
| 1,893,096 | 1/1933 | Michaud | 248/170 |
| 1,992,233 | 8/1933 | Norwood | 248/474 |
| 2,237,202 | 4/1941 | Strattan | 248/170 |
| 2,591,888 | 4/1952 | Steffen | 248/170 |
| 3,165,847 | 1/1965 | Gunerson | 248/472 |

Primary Examiner—Rodney B. Bovernick
Assistant Examiner—R. D. Shafer
Attorney, Agent, or Firm—Leon Gilden

[57] ABSTRACT

A support tube including inter-folded legs is readily mounted upon a support surface, with a telescoping rod received within the tube. The upper terminal end of the rod includes a socket connection mounting rotatably therewithin a convex mirror for positioning rearwardly of a vehicle to permit an operator to visually observe operation of tail light assemblies of the vehicle. A modification of the invention includes signal alert apparatus removably mounted to the rod for use as an alert device during maintenance of vehicular light assemblies.

1 Claim, 4 Drawing Sheets

FIG. 2
FIG. 3
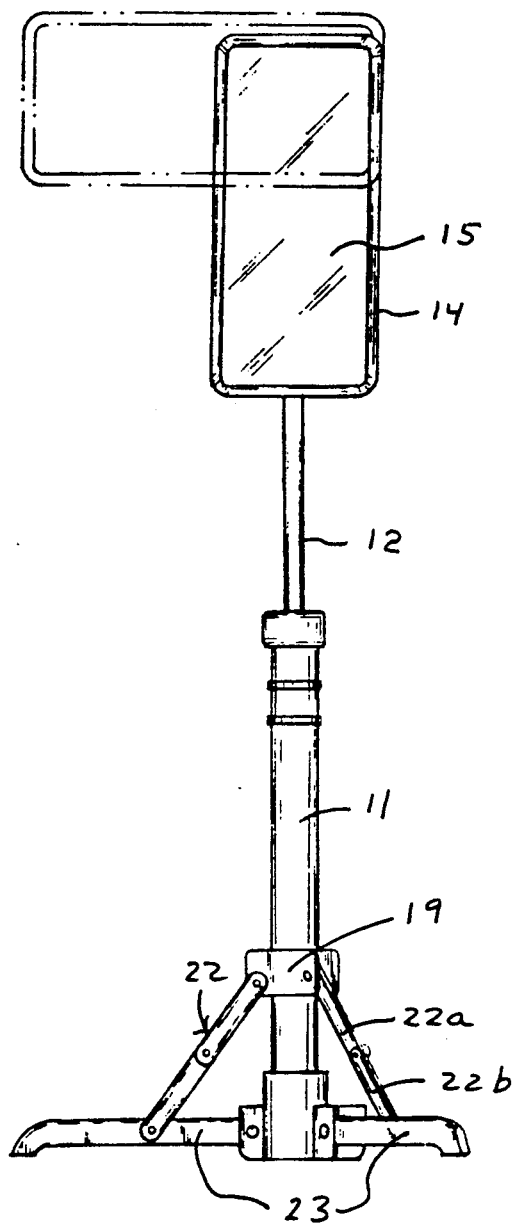
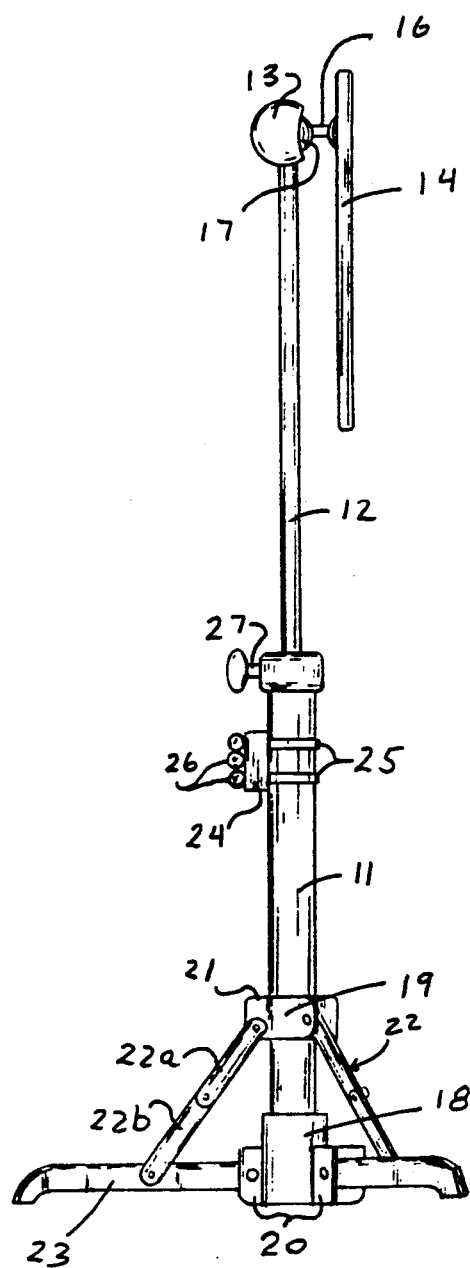

FIG. 4
FIG. 5
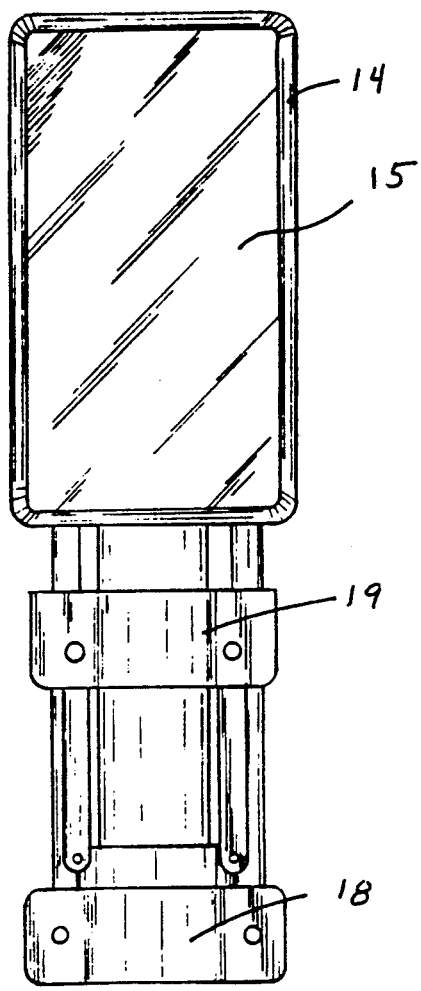
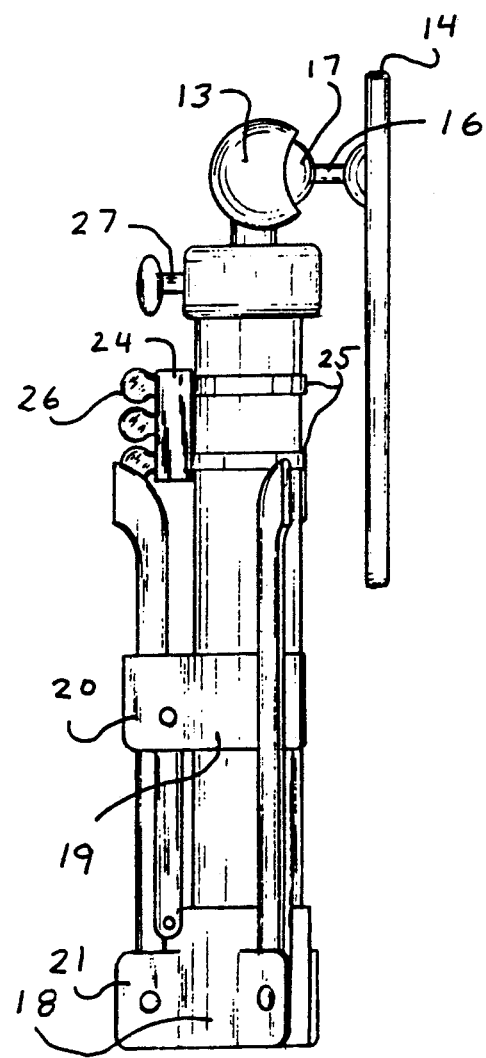

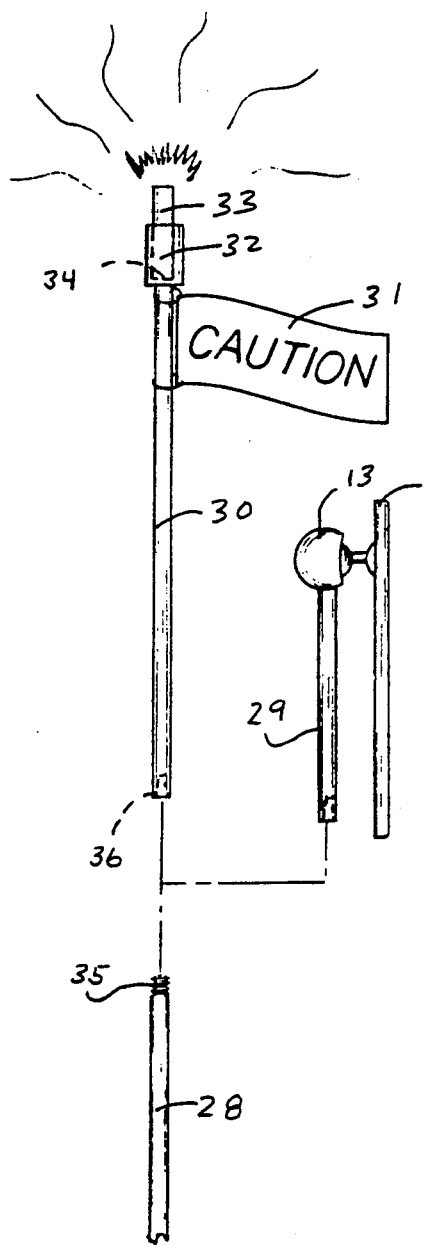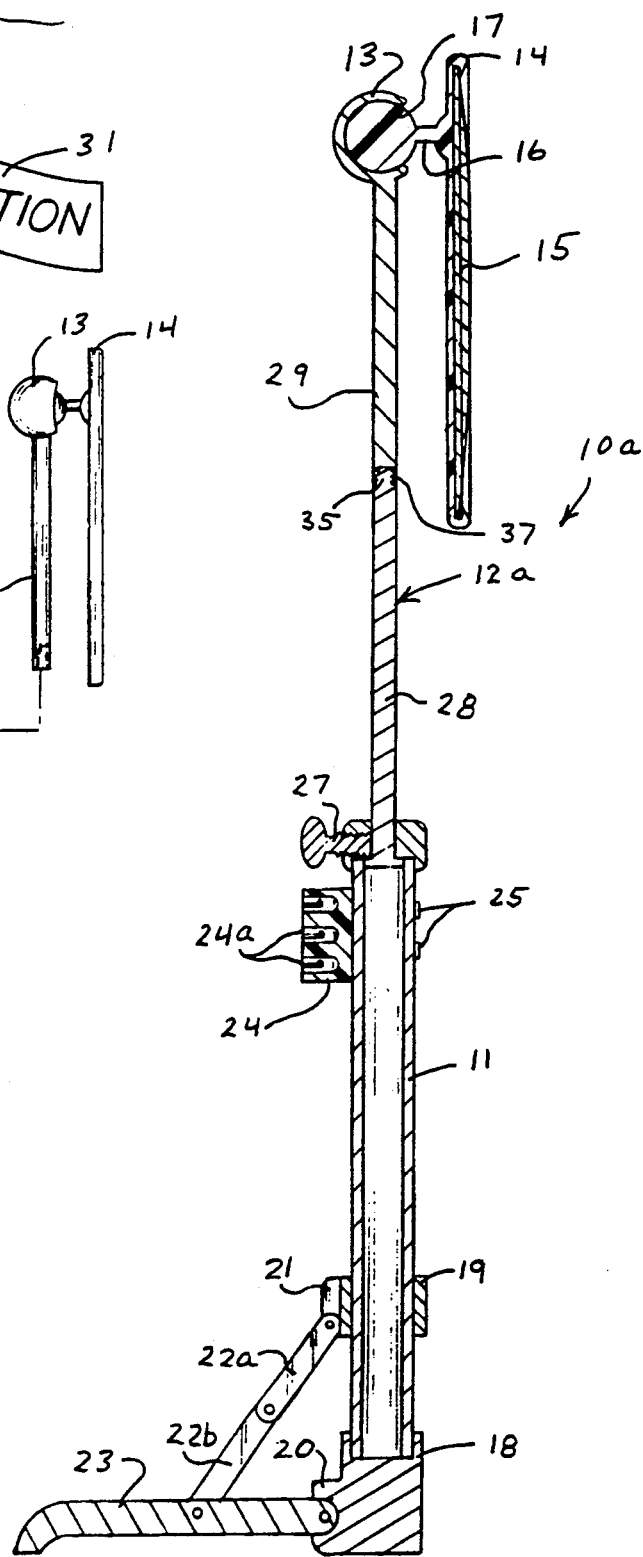

VEHICULAR LIGHT MONITORING APPARATUS

BACKGROUND OF THE INVENTION

1. Field of the Invention

The field of invention relates to visual observation devices, and more particularly pertains to a new and improved vehicular light monitoring apparatus wherein the same permits an individual to properly observe operation and functioning of vehicular tail light assemblies.

2. Description of the Prior Art

Various mirror-type devices have been utilized in the prior art for permitting observation of remote orientations relative to an individual observer. In overland travel of vehicles, particularly truck members, proper operation of the tail light assemblies are mandatory to prevent inadvertent penalty and associated hazard to other relatively traveling vehicles relative to the truck. The instant invention attempts to overcome deficiencies of the prior art by providing an assembly permitting a single individual to properly observe the operation of tail light assemblies relative to an associated vehicle such as a truck.

Prior art observation vehicles utilized in the prior art are exemplified by U.S. Pat. No. 4,839,968 to Logsdon setting forth a golf green viewing device wherein a mirror is positioned for observing the green relative to a target putting hole.

U.S. Pat. No. 4,941,263 to Hirshberg utilizes a reflective mirror operative with an associated target image to properly orient a vehicle within a garage.

U.S. Pat. No. 4,730,926 to Wedemeyer sets forth a mirror alignment system for properly orienting a side-view mirror relative to a motor vehicle.

As such, it may be appreciated that there continues to be a need for a new and improved vehicular light monitoring apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of monitoring apparatus now present in the prior art, the present invention provides a vehicular light monitoring apparatus wherein the same is arranged for remote observation of proper operation of an associated motor vehicle. As such, the general purpose of the present invention, which will be described subsequently in greater detail, is to provide a new and improved vehicular light monitoring apparatus which has all the advantages of the prior art monitoring apparatus and none of the disadvantages.

To attain this, the present invention provides a support tube including inter-folded legs readily mounted upon a support surface, with a telescoping rod received within the tube. The upper terminal end of the rod includes a socket connection mounting rotatably therewithin a convex mirror for positioning rearwardly of a vehicle to permit an operator to visually observe operation of tail light assemblies of the vehicle. A modification of the invention includes signal alert apparatus removably mounted to the rod for use as an alert device during maintaneance of vehicular light assemblies.

My invention resides not in any one of these features per se, but rather in the particular combination of all of them herein disclosed and claimed and it is distinguished from the prior art in this particular combination of all of its structures for the functions specified.

It is therefore an object of the present invention to provide a new and improved vehicular light monitoring apparatus which has all the advantages of the prior art monitoring apparatus and none of the disadvantages.

It is another object of the present invention to provide a new and improved vehicular light monitoring apparatus which may be easily and efficiently manufactured and marketed.

It is a further object of the present invention to provide a new and improved vehicular light monitoring apparatus which is of a durable and reliable construction.

An even further object of the present invention is to provide a new and improved vehicular light monitoring apparatus which is susceptible of a low cost of manufacture with regard to both materials and labor, and which accordingly is then susceptible of low prices of sale to the consuming public, thereby making such vehicular light monitoring apparatus economically available to the buying public.

Still yet another object of the present invention is to provide a new and improved vehicular light monitoring apparatus which provides in the apparatuses and methods of the prior art some of the advantages thereof, while simultaneously overcoming some of the disadvantages normally associated therewith.

Still another object of the present invention is to provide a new and improved vehicular light monitoring apparatus wherein the same may be conveniently interfolded for convenience of transport and storage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic front view, taken in elevation, of the instant invention.

FIG. 3 is an orthographic side view, taken in elevation, of the instant invention.

FIG. 4 is an orthographic frontal view, taken in elevation, of the organization in an interfolded configuration.

FIG. 5 is an orthographic side view of the instant invention in an interfolded configuration.

FIG. 6 is an orthographic cross-sectional configuration of a modification of the instant invention.

FIG. 7 is an orthographic exploded side view of an accessory organization utilized by the instant invention to provide a vehicle monitoring and repair kit assembly.

DESCRIPTION OF THE PREFERRED EMBODIMENT

Figure 1:
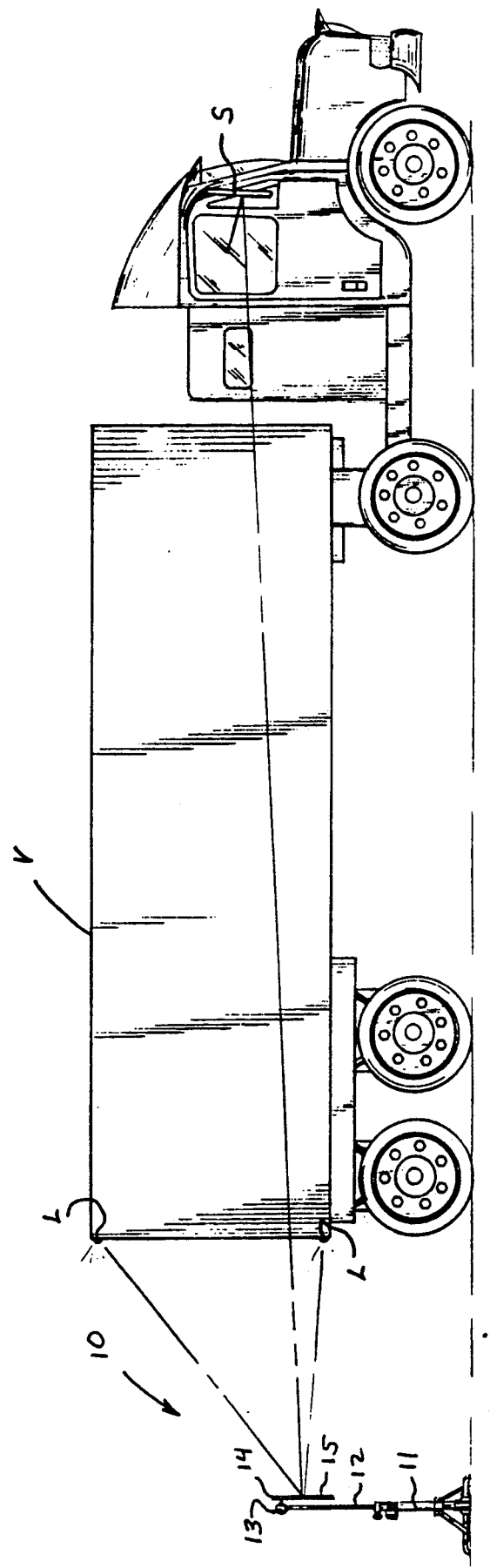
FIG. 1 is an orthographic side view of the instant invention in association with a motorized vehicle.

With reference now to the drawings, and in particular to FIGS. 1 to 7 thereof, a new and improved vehicular light monitoring apparatus embodying the principles and concepts of the present invention and generally designated by the reference numerals 10 and 10a will be described.

More specifically, the vehicular light monitoring apparatus 10 of the instant invention essentially comprises the device positioned rearwardly of an associated vehicle "V" to monitor proper operation of the upper and lower light assemblies "L" relative to the vehicle by an individual within the cab portion of the vehicle "V", utilizing side view mirrors "S" of the associated vehicle. The apparatus includes a vertical support tube 11 telescopingly mounting a telescoping rod 12 therewithin. The telescopingly rod 12 includes an upper terminal end mounting a pivot socket connection 13 pivoting mounting a spherical member 17 therewithin. The spherical member 17 includes an extension leg 16 fixedly mounted thereto, with the extension leg 16 mounted to a mirror support frame 14. The mirror support frame 14 mounts a convex mirror 15 coextensively directed within the frame 14. The use of a convex mirror is required to permit compact construction and further permit proper observation of the upper and lower light assemblies "L", with a single setting or positioning of the mirror 15 relative to the light assemblies "L".

The support tube 11 includes an upper collar 19 mounted about the support tube spaced from a lower collar 18. The lower collar 18 includes a plurality of lower flanges 20 radially directed exteriorly of the lower collar 18 and the support tube 11. Similarly, the upper collar 19 includes a plurality of upper flanges 21 that are radially directed exteriorly of the upper collar 19. Each lower flange 20 is aligned with a respective upper flange 21 to pivotally mount a pivot link pair 22 between an associated pair of lower and upper flanges 20 and 21. Each pivot link pair 22 includes an upper link 22a and a lower link 22b. The upper link 22a is pivotally mounted at its upper terminal end to a respective upper flange 21, with each lower terminal end of each lower link 22b pivotally mounted medially of a leg link 23 that in turn is pivotally mounted at its rear terminal end to a respective lower flange 20. The upper and lower links are pivotally mounted to each other at a lower terminal end of the upper link 22a and to an upper terminal end of the lower link 22b. In this manner, the organization may be interfolded to a second aligned position, as illustrated in FIG. 5, wherein the leg links 23 are generally arranged parallel relative to an axis of the support tube 11.

For convenience, a bulb support housing 24 is mounted to the support tube 11 below an upper terminal end of the support tube, including a plurality of strap members 25 to mount the housing 24 to the support tube, wherein the bulb support housing 24 includes a plurality of bulb sockets 24a, each removably mounting an illumination bulb 26 therewithin for ease of replacement and maintenance of an associated light assembly "L". It should be noted further that a clamp rod 27 orthogonally mounted to the axis of a support tube 11 is mounted to an upper terminal end of the support tube 11 for selective locking of the telescoping rod relative to the support tube 11.

FIGS. 6 and 7 illustrate a modified telescoping rod 12 defined by a lower rod 28 selectively removable to an upper first rod 29. The lower rod 28 includes a threaded upper end 30 threadedly received within an internally threaded first rod lower end 37, as illustrated in FIG. 6. During maintenance of the light assembly "L", an individual is provided use of an associated upper second rod 30 mounted threadedly to the threaded upper end 35 by an internally threaded second rod lower end 36. The upper second rod 30 includes a flexible flag member 31 providing cautioning to other motorists of the associated vehicle "V", as well as the use of a second rod support socket 32, including a cylindrical cavity 34 to receive and mount a flare 33 therewithin. The flare 33 provides illumination in association with the flag 31 to provide caution to the positioning of the vehicle "V". Accordingly, the modified apparatus 10a provides for a kit structure permitting an individual to initially observe and subsequently repair the associated light assemblies "L" utilizing relative proper precautionary techniques.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular light monitoring apparatus, comprising in combination,
    a vertical support tube, the vertical support tube including a tube lower terminal end and a tube upper terminal end, and
    a telescoping rod telescopingly received coaxially within the vertical support tube through the tube upper terminal end, and the support tube further including a clamp lock member to selectively and clampingly lock the telescoping rod relative to the support rod, and
    the telescoping rod including a rod upper terminal end, the rod upper terminal end including a pivot connection, and
    the pivot connection including an extension leg, the extension leg fixedly mounted to a mirror support frame, and the mirror support frame mounting a convex mirror contained therewithin extending coextensively of the mirror support frame, and
    a lower collar mounted to the tube lower terminal end of said support tube, and an upper collar mounted to the support tube spaced above the tube lower terminal end below the tube upper terminal end, and linkage means mounted to the lower collar and upper collar for selective positioning of the support tube in a vertical orientation relative to a support surface, and the lower collar includes a plurality of lower flanges directed radially and exteriorly of the lower collar, and the upper collar includes a plurality of upper flanges directed radially and exteriorly of the upper collar, and each upper flange is aligned with a respective lower flange defining a flange pair, and the linkage means includes a plurality of pivot link pairs, and each pivot link pair of the plurality of pivot link pairs is mounted to one of said flange pairs, and each of the pivot link pairs includes an upper link pivotally mounted to an upper flange and a lower link, and each pivot link pair includes a leg link pivotally mounted at a rear terminal end of the leg link to the lower flange of each of said flange pairs, and each lower link of each of the pivot link pairs mounted medially of a respective leg link, and including a bulb support housing, the bulb support housing mounted to the support tube below the tube upper terminal end, the bulb support housing including a plurality of bulb sockets mounted therewithin, and each of the bulb sockets removably mounting an illumination bulb therewithin.

* * * * *